United States Patent [19]
Weintz

[11] 3,983,980
[45] Oct. 5, 1976

[54] FLUID SHEAR-FRICTION COUPLING

[75] Inventor: Johann Weintz, Freiberg-Geisingen, Germany

[73] Assignee: Daimler-Benz Aktiengesellschaft, Germany

[22] Filed: Oct. 23, 1974

[21] Appl. No.: 517,374

[30] Foreign Application Priority Data
Oct. 25, 1973 Germany............................ 2353461

[52] U.S. Cl............................... 192/58 B; 192/82 T
[51] Int. Cl.[2]......................................... F16D 31/00
[58] Field of Search........................ 192/58 B, 82 T

[56] References Cited
UNITED STATES PATENTS

| | | | |
|---|---|---|---|
| 2,020,002 | 11/1935 | Schweich .......................... | 192/58 B |
| 3,841,451 | 10/1974 | Saylor et al. ..................... | 192/58 B |

FOREIGN PATENTS OR APPLICATIONS

| | | | |
|---|---|---|---|
| 2,009,268 | 12/1970 | Germany........................... | 192/58 B |
| 460,040 | 10/1950 | Italy ................................... | 192/58 B |
| 687,784 | 2/1953 | United Kingdom .............. | 192/58 B |

*Primary Examiner*—Samuel Scott
*Assistant Examiner*—Randall Heald
*Attorney, Agent, or Firm*—Craig & Antonelli

[57] ABSTRACT

A rotating fluid shear friction coupling with at least one shear friction gap formed by a wall rotating along with the input side and by a wall rotating along with the output side, and with two spaces in communication with the working gap, one on the inlet side and one on the outlet side; the radially outermost passage of the inlet side space into the working gap has radially a larger spacing from the center of rotation than the radially outermost passage from the outlet side space whereby the two spaces are separated from one another by a wall provided with controllable passages; the working gap is also provided with means, for example, in the form of a helical feed groove for the continuous automatic feed of the working medium through the working gap in the direction toward the space on the outlet side; the space on the outlet side has thereby a space portion which is delimited radially outwardly by walls that preferably rotate with one another as a unit, and is disposed radially outwardly of the radius of the radially outermost passage from the gap to the outlet side space whereby the volume of this space portion is such as to be sufficient for accommodating at least the predominant part of the volume of the working medium.

24 Claims, 1 Drawing Figure

U.S. Patent  Oct. 5, 1976  3,983,980
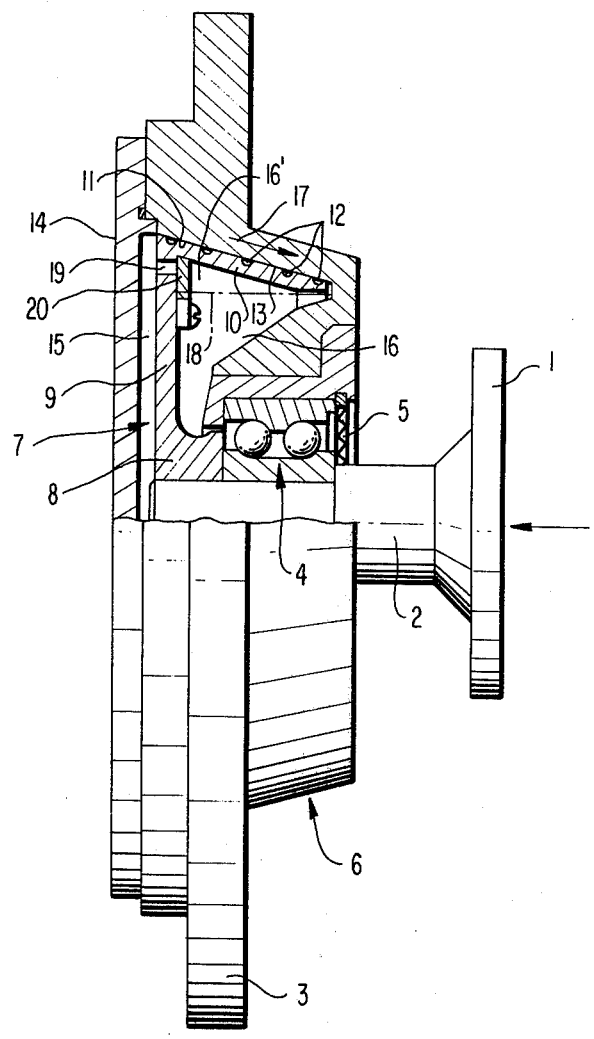

FLUID SHEAR-FRICTION COUPLING

The present invention relates to a rotating fluid shear friction coupling with at least one shear friction gap (working gap) formed respectively by an input and output wall rotating along with the input and output side, with one space each at the inlet side and at the outlet side arranged at the working gap or gaps and in communication therewith, whereby the radially outermost passage of the inlet side space into the working gap or gaps has radially a larger distance from the center of rotation than the radially outermost passage from the outlet side space and whereby the two spaces are separated from one another by a wall provided with controllable passages, further with means, preferably with a feed worm or helix, in the working gap or gaps for the continuous automatic feed of the working medium through the working gap or gaps in the direction toward the outlet side space.

Such a coupling is described, for example, in the German Offenlegungsschrift No. 2,009,268. Such couplings are used above all for the controlled drive of fan wheels of engine radiators. In this application, above a predetermined rotational speed of the engine, at which as a rule the driving velocity is large and the driving air stream suffices for the cooling purposes and above which a rigid coupling of the fan wheel would only consume unnecessary power, a separation of the coupling is desired. This separation of the coupling is to be realized, for example, by a shifting dependent on the centrifugal force, namely, by a closing off of the passages in the wall between the inlet side space and the outlet side space so that on the inlet side the working medium is fed away by the feed effect of the working gap and collects in the outlet side space so that finally the working gap is emptied completely of the working medium. This possibility of the coupling separation, however, entailed in the practical realization the disadvantage that an accumulation or back-up of working medium formed at the outlet side end of the working gap which, by reason of the centrifugal force opposed a centrifugally directed force acting opposite the centripetal feed effect of the working gap and which thus prevented a complete emptying of the working gap from the working medium. In the final result, this produces not only a relatively high idling moment but by reason of the relatively high rotational speeds at the input side also a high slippage rotational speed and therewith a high power loss increasing as a third power of the slippage rotational speed which heats up the working medium and the coupling. Notwithstanding an intensive cooling of the coupling, temperatures of about 230° C. occurred which were controllable only with very expensive synthetic types of oils.

It is an aim of the present invention to so construct the coupling of the aforementioned type that a good emptying of the working gap is possible and accordingly the idling torque of the coupling and, as a result thereof, the power loss and the temperature development are very small so that commercially available, less expensive types of oil can be used as working medium.

The underlying problems are solved according to the present invention in that the outlet side space of the aforementioned coupling includes a space component (storage space) disposed radially outwardly of the radius of the radially outermost passage connecting the working gap with the outlet-side space and limited radially outwardly preferably only by walls rotating as a unit, whose space volume suffices for the accommodation at least of the predominant portion of the volume of the working medium. Expressed in other words, the outlet side storage space is displaced inside of the centrifugal force field to a lesser potential than that of the passage from the working gap into the storage space. As a result thereof, no back-up preventing the feed effect can form any longer in the discharge of the working gap. The working gap can therefore empty itself without impairment. As a result thereof, the idling moment of the coupling decreases quite considerably and the power loss and the idling temperature occurring accordingly lie still within the permissive range of ordinary highly viscous types of oil which are commercially available.

In order to assure a rapid outflow of the working medium discharged at the working gap on the outlet side into the storage space according to the present invention, it is appropriate that the storage space is delimited radially outwardly only by walls rotating along with the input side. More particularly, the input side rotates more rapidly than the output side and thus the centrifugal force influence on the discharged oil flowing into the storage space is larger with such a construction than with a storage space arrangement on the output side.

For purposes of favoring a complete emptying of the working gap, it is appropriate if the latter is free of corners, preferably if it is rectilinear, especially when it extends conically. This is so as at the corner locations not only an accumulation of working medium but also a collection of dirt may form at these places by reason of the poorer feed effect. Both place obstacles into the path of a complete emptying of the working gap. With a conical configuration of the working gap, a large working gap surface may be accommodated notwithstanding a slight difference in radius at the inlet compared to the outlet, i.e., a large working moment can be transmitted.

Accordingly, it is an object of the present invention to provide a fluid shear friction coupling which avoids by simple means the aforementioned shortcomings and drawbacks encountered in the prior art.

Another object of the present invention resides in the fluid shear friction coupling which permits a complete emptying of the working gap under all normal operating conditions.

A further object of the present invention resides in a fluid shear friction coupling which avoids high idling torques and therewith excessive heat development.

Still a further object of the present invention resides in a fluid shear friction coupling which permits the use of commercially available oils as working mediums.

Still another object of the present invention resides in a fluid shear friction coupling in which no back-up of working medium builds up which prevents the complete emptying of the working gap.

Another object of the present invention resides in a fluid coupling of the aforementioned type which permits a rapid discharge of the working gap at the outlet side while at the same time precluding the collection of dirt in the discharge path.

These and other objects, features and advantages of the present invention will become more apparent from the following description when taken in connection with the accompanying drawing which shows, for purposes of illustration only, one embodiment in accordance with the present invention, and wherein:

The single FIGURE is an elevational view, partly in cross section, through a fluid shear friction coupling in accordance with the present invention.

Referring now to the single FIGURE of the drawing, with the coupling illustrated therein, the input shaft provided with a coupling flange 1 which is driven in a conventional manner, is designated by reference numeral 2 and the coupling housing also provided with a flange 3 is generally designated therein by reference numeral 6. The coupling housing 6 is supported overhung on the drive shaft 2 by means of the roller bearing generally designated by reference numeral 4 and is sealed off by means of the seal 5. The coupling housing 6 forms the output or driven part of the coupling. The drive disk generally designated by reference numeral 7 is non-rotatably arranged on the drive shaft 2 on the inside of the coupling; the drive disk 7 includes, in addition to the hub 8, the wheel disk 9 serving as separating or partition wall and the conical input-side friction flange 10, on the outside of which is provided the conical primary friction surface 11 provided with a worked-in helical feed groove 12. The housing 6 is provided at the corresponding place with a further output side friction surface 13 extending parallel to the friction surface 11. The housing 6 together with the friction surface 13 is supported in such an axial position on the shaft 1 or with respect to the drive disk 7 together with the other friction surface 11 that a shear friction or working-gap 11/13 of defined gap width, for example, of 1/10 mm. is formed between the parallelly extending friction surfaces 11 and 13. Any possible axial play within the bearing 4 and axial expansions conditioned by temperature do have some effect on the gap width by reason of the conicity of the gap. However, on the one hand, these axial movements are relatively small as viewed absolutely—the axial structural height of the coupling is itself quite small—and on the other hand, these axial movements affect the gap width only by a fraction—namely by the sine of the cone angle, in the illustrated embodiment by about one-fourth—and as to the rest, slight gap width changes within the range of the order of magnitude of the gap width itself and below are functionally negligible since only gap width enlargements of very much greater extent have a noticeable influence. A disk-shaped space, the inlet side space 15, is formed between the housing cover 14 and the wheel disk 9 of the drive disk 7. The helical feed groove 12 is so worked-in that in the normal operating direction of rotation of the coupling or during the normal relative direction of rotation of the driving friction surface 11 with respect to the other, driven friction surface 13, a feed effect (direction of arrow 17) results which pulls the working medium from the space 15 into the working gap, through the working gap and into the outlet side space 16 that forms between the housing 6 and the drive disk 7. The friction flange 10 terminates on one side relatively pointedly so that a passage of relatively slight radial height from the working gap end into the outlet-side space 16 results. The radial level of this overflow edge from the working gap 11/13 into the outlet-side space 16 is indicated by the dash and dot line 18. Radially outwardly of this level line 18, a portion 16' of the outlet side space 16 is radially outwardly limited by the friction flange 10 and by the wheel disk 9, i.e., by the walls on the input side and therefore rotating more rapidly. This space portion 16' is the storage space for the working oil, properly speaking. Controllable passages 19 are arranged at the lowest, i.e., radially outermost place of the storage space 16' which connect the storage space 16 with the inlet-side space 15 and which are adapted to be closed by a slide member 20 actuated by centrifugal force and/or as a function of temperature. Since such slide member 20 and its control is known as such, a detailed description thereof is dispensed with herein. The storage space 16', approximately with a predetermined average working gap diameter and friction surface size, is of such large construction, for example, by reason of a corresponding steepness of the working gap cone that it is able to accommodate the entire volume of the working medium of the coupling.

With a closed passage 19, the working medium collects in the storage space 16' afer a predetermined time by reason of the feed effect of the working gap 11/13. No accumulation or back-up of working fluid forms at the discharge end of this gap owing to the narrow termination of the friction flange 10 toward the working gap and owing to the storage space disposed radially outwardly of the overflow level 18 so that the working gap can empty itself without impairment after a closing off of the passage 19. Only a slight idling torque is then transmitted in the coupling by reason of the good emptying of the gap and the idling losses and idling temperatures are correspondingly quite tolerable.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A rotating fluid shear friction coupling which includes at least one working gap means formed by wall means rotating in unison with the input side and output side, respectively, two space means, one space means each in communication with the inlet side of the working gap means and one space means each in communication with the outlet side of the working gap means, the radially outermost passage of the inlet side space means into the working gap means having radially a larger spacing from the center of rotation than the radially outermost passage from the working gap means into the outlet-side space means, both space means being separated from one another by wall means provided with controllable passage means, and means in the working gap means for the continuous automatic feed of the working medium through the working gap means in the direction toward the space means on the outlet side, characterized in that the space means on the outlet side includes a space portion disposed radially outwardly of the radius of the radially outermost passage from the working gap means into said outlet-side space means and is delimited radially outwardly by rotating wall means, the space volume of the space portion being sufficient for the accommodation of at least the predominant portion of the volume of the working medium.

2. A coupling according to claim 1, characterized in that said further means includes helical feed groove means.

3. A coupling according to claim 2, characterized in that said wall means delimiting radially outwardly the space portion are formed by walls which rotate as a unit with one another.

4. A coupling according to claim 3, characterized in that the space portion is delimited radially outwardly only by wall means rotating along with the input side.

5. A coupling according to claim 4, characterized in that the working gap means is essentially free of corners.

6. A coupling according to claim 5, characterized in that the working gap means is substantially rectilinear.

7. A coupling according to claim 6, characterized in that the working gap means extends essentially conically.

8. A coupling according to claim 7, characterized in that said further means includes helical feed groove means.

9. A coupling according to claim 8, characterized in that said wall means delimiting radially outwardly the space portion are formed by walls which rotate as a unit with one another.

10. A coupling according to claim 1, characterized in that the space portion is delimited radially outwardly only by wall means rotating along with the input side.

11. A coupling according to claim 10, characterized in that the working gap means is essentially free of corners.

12. A coupling according to claim 10, characterized in that the working gap means is substantially rectilinear.

13. A coupling according to claim 10, characterized in that the working gap means extends essentially conically.

14. A coupling according to claim 10, characterized in that said further means includes helical feed groove means.

15. A coupling according to claim 1, characterized in that a housing means is provided for housing the coupling, cover means are disposed over an end of said housing means and define therewith an internal chamber, said two space means being disposed within said internal chamber.

16. A coupling according to claim 15, characterized in that the inlet space means is defined between said cover means and said wall means provided with controllable passage means.

17. A coupling according to claim 1, characterized in that a housing means is provided for housing the coupling, said wall means provided with controllable passage means is disposed within said housing means and includes a flange means, said flange means constituting said rotating wall means and defining with a wall means of the housing means said at least one working gap means.

18. A coupling according to claim 17, characterized in that said flange means terminates in a relatively pointed end, said pointed end and at least a wall of the housing means defining the radially outermost passage from the working gap means into the outlet side space means.

19. A coupling according to claim 18, characterized in that a cover means is provided and disposed over an end of said housing means and defines therewith an internal chamber, said two space means are disposed within said internal chamber.

20. A coupling according to claim 19, characterized in that the inlet side space means is defined between said cover means and said wall means provided with controllable passage means.

21. A coupling according to claim 20, characterized in that said working medium continuous automatic feed means are disposed on said flange means.

22. A coupling according to claim 21, wherein said working medium continuous automatic feed means includes helical groove means provided on a surface of said flange means disposed opposite the wall means of said housing means with which said flange means defines said at least one working gap means.

23. A coupling according to claim 1, characterized in that a housing means is provided for housing the coupling, said two space means are each defined by internal continuous walls of said housing means.

24. A coupling according to claim 1, characterized in that a housing means is provided for housing the coupling, said wall means provided with controllable passage means is a continuous wall disposed within said housing means.

* * * * *